(12) United States Patent
Weissenbacher et al.

(10) Patent No.: US 6,258,250 B1
(45) Date of Patent: Jul. 10, 2001

(54) METHOD TO REDUCE OR PREVENT SCALING

(75) Inventors: Andreas Weissenbacher, Walter-Simmer-Strasse 4, A-5310 Mondsee (AT); Jürgen Johann, Nussloch (DE); Ernst Oberhauser, Golling; Helmut Irauschek, Uttendorf, both of (AT)

(73) Assignee: Andreas Weissenbacher, Mondsee (AT)

( * ) Notice: Subject to any disclaimer, the term of this patent is extended or adjusted under 35 U.S.C. 154(b) by 0 days.

(21) Appl. No.: 09/284,441

(22) PCT Filed: Oct. 8, 1997

(86) PCT No.: PCT/IB97/01243
§ 371 Date: Apr. 14, 1999
§ 102(e) Date: Apr. 14, 1999

(87) PCT Pub. No.: WO98/16477
PCT Pub. Date: Apr. 23, 1998

(30) Foreign Application Priority Data

Oct. 15, 1996 (CH) .................................... 2508/96
Jul. 29, 1997 (CH) .................................... 1816/97

(51) Int. Cl.$^7$ .............................. C02F 1/461; C25B 1/00
(52) U.S. Cl. .......................... 205/742; 205/754; 205/758; 205/341; 205/342
(58) Field of Search .................................... 205/742, 754, 205/758, 341, 342

(56) References Cited

U.S. PATENT DOCUMENTS

| | | | |
|---|---|---|---|
| 3,888,756 | * 6/1975 | Teshima et al. | 204/275 |
| 3,915,822 | 10/1975 | Veltman | 204/151 |
| 4,119,518 | 10/1978 | Miller | 204/263 |
| 4,123,339 | 10/1978 | Gale et al. | 204/149 |
| 4,176,038 | * 11/1979 | Moeglich | 204/277 |
| 5,256,268 | 10/1993 | Goto et al. | 204/268 |

FOREIGN PATENT DOCUMENTS

| | | |
|---|---|---|
| 0171357 | 2/1986 | (EP) . |
| 0408984 | 1/1991 | (EP) . |
| 2108029 | 5/1972 | (FR) . |
| 2547573 | 12/1984 | (FR) . |
| 1409419 | 10/1975 | (GB) . |
| 4-27491 | 1/1992 | (JP) . |
| 6-63558 | * 3/1994 | (JP) . |

* cited by examiner

*Primary Examiner*—Edna Wong
(74) *Attorney, Agent, or Firm*—Leydig, Voit & Mayer, Ltd.

(57) ABSTRACT

A method of reducing scale formation in an aqueous solution using an electrolysis apparatus which has, in an electrolysis chamber, at least two electrodes and a bipolar electrode between the two electrodes includes feeding an aqueous solution to the electrolysis chamber, applying either a DC potential to the two electrodes so that one electrode is an anode and the other electrode is a cathode and reversing the polarity of the electrodes at intervals so that the composition of the aqueous solution remains essentially unchanged, or applying an AC potential to the two electrodes, producing, after the aqueous solution has passed through the electrolysis chamber, a treated aqueous solution having a significantly reduced tendency to form scale.

23 Claims, 1 Drawing Sheet

US 6,258,250 B1

METHOD TO REDUCE OR PREVENT SCALING

This is a national stage application of PCT/IB97/01243 filed Oct. 8, 1997.

BACKGROUND OF THE INVENTION

The invention relates to a method of reducing or preventing scale formation from aqueous solutions and also to an electrolysis apparatus for implementing this method.

The formation of scale from aqueous solutions is attributable mainly to the calcium and magnesium content of natural water and presents a general problem both in industrial and commercial operations and in the household since it causes a considerable need for maintenance and shortens the life of the appliances. To avoid these problems, it is usual to add chemicals which prevent scaling or to remove the substances which lead to scale formation, e.g. by means of ion-exchange processes, reverse osmosis, electrolysis and the like.

It is also known that the use of bipolar electrodes which can be configured as a fixed bed of conductive and nonconductive particles or as a fluidized bed of conductive particles makes possible higher space-time yields in electrolysis processes. Such processes are described, for example, in Electrochimica Acta 22, 347–352 (1977) and in Electrochimica Acta 22, 1087–1091 (1977) for preparing hypobromite, for the epoxidation of styrene, for the synthesis of the dimethyl ester of sebacic acid and for preparing hypochlorite from seawater. However, bipolar electrodes have not hitherto been used in water treatment.

Furthermore, GB-A-1 409 419 discloses a method of rendering pollutants such as chromic acid, cyanide or nitrate in aqueous solutions harmless by means of electrolysis using a bipolar fixed-bed electrode, in which there is added to the electrolyte a compound which reacts, or whose reaction product reacts, with the pollutant to form a compound which is not harmful. The bipolar electrode comprises nonmetallic, electrically conductive particles and can preferably also contain nonconductive particles.

An electrolysis cell having a bipolar fixed-bed electrode which can be opened at the upper end by means of a flap to allow easy replacement of the fixed bed is described in JP-A-04/027 491.

Electrochemical removal of contaminating ions from an aqueous medium is also described in U.S. Pat. No. 4,123,339, but this method uses electrodes made of iron or an insoluble iron compound and iron ions are released at the anode and hydroxide is formed at the cathode under the action of direct current, which is said to result in reaction with the contaminating ions to form an insoluble material which can be separated off. Uniform consumption of the electrodes can be achieved by reversal of the polarity.

U.S. Pat. No. 3,915,822 describes an electrochemical cell which, in the reaction zone, contains at least one bed of electrically conductive particles and has a plurality of electrodes which define adjacent chemical sections in which different voltage gradients can be maintained. The cell is said to be suitable for metal recovery, for adsorption and desorption of organic compounds, for oxidation of wastewater, for the synthesis of organic and inorganic compounds and the like.

DE-C-41 07 708 proposes a method of treating flowing water to prevent limescale by cavitation and an electric AC field, in which cavitation forms zones in which the pressure is significantly below the surrounding pressure in the water to be treated, which is said to result in local outgassing of the $CO_2$ dissolved in the water and thus in a disturbance of the lime-carbon dioxide equilibrium and a decrease in the calcium solubility, and in which the water which has been treated in this way is passed between at least two electrodes. The use of electrodes having a structured surface, e.g. knobs, is said to make it possible to achieve the desired treatment effect at low voltages. However, it has been found in practice that the reduction in limescale which can be achieved by this method is barely significant.

Furthermore, EP-A-0 171 357 discloses an electrochemical method of softening water in which the alkaline pH in the vicinity of the cathode effects precipitation of the Ca and Mg ions in the form of their oxides and hydroxides which deposit on a porous inert material located between the electrodes. The porous material can be regenerated by reversing the polarity of the electrodes.

Since the known methods by means of which scale formation from aqueous solutions can be effectively prevented or reduced involve the addition of chemicals or the complete or substantial removal of the materials leading to scale formation they are often not very suitable, if at all, for water treatment. In particular, in the treatment of drinking water it is generally desirable for the natural salt content of the drinking water to be changed only slightly or not at all.

SUMMARY OF THE INVENTION

It has now surprisingly been found that scaling can be considerably reduced or prevented entirely if the aqueous solution is pretreated in an electrolysis apparatus which has a bipolar electrode and in which the direction of the direct current is periodically reversed. In comparative experiments, it was found, for example, that scale formation in a downstream boiler can be largely or completely avoided by means of such pretreatment. This finding is particularly surprising because the effect also occurs when the salt content and the pH of the water remain virtually unchanged. Furthermore, it was surprisingly found that the effect also occurs when an AC voltage is applied to the electrodes. There is as yet no explanation for this effect. It is possible that a slight shift in the lime-carbon dioxide equilibrium slows the kinetics of calcite precipitation so that scale formation is significantly reduced or prevented at the customary residence times in pipes and water heaters.

The present invention accordingly provides a method of reducing or preventing scale formation from aqueous solutions, in which the aqueous solution which tends to form scale is fed to an electrolysis chamber which has at least two electrodes and in addition a bipolar electrode between the electrodes and, after passing through the electrolysis chamber, a treated aqueous solution having a significantly reduced tendency to form scale is obtained, with the method being characterized in that a DC potential is applied to the electrodes so that at least one electrode acts as anode and at least one electrode acts as cathode and the polarity of the electrodes is reversed at intervals of time in such a way that the composition of the water fed in remains essentially unchanged, or in that an AC potential is applied to the electrodes.

DETAILED DESCRIPTION

Figure 1:
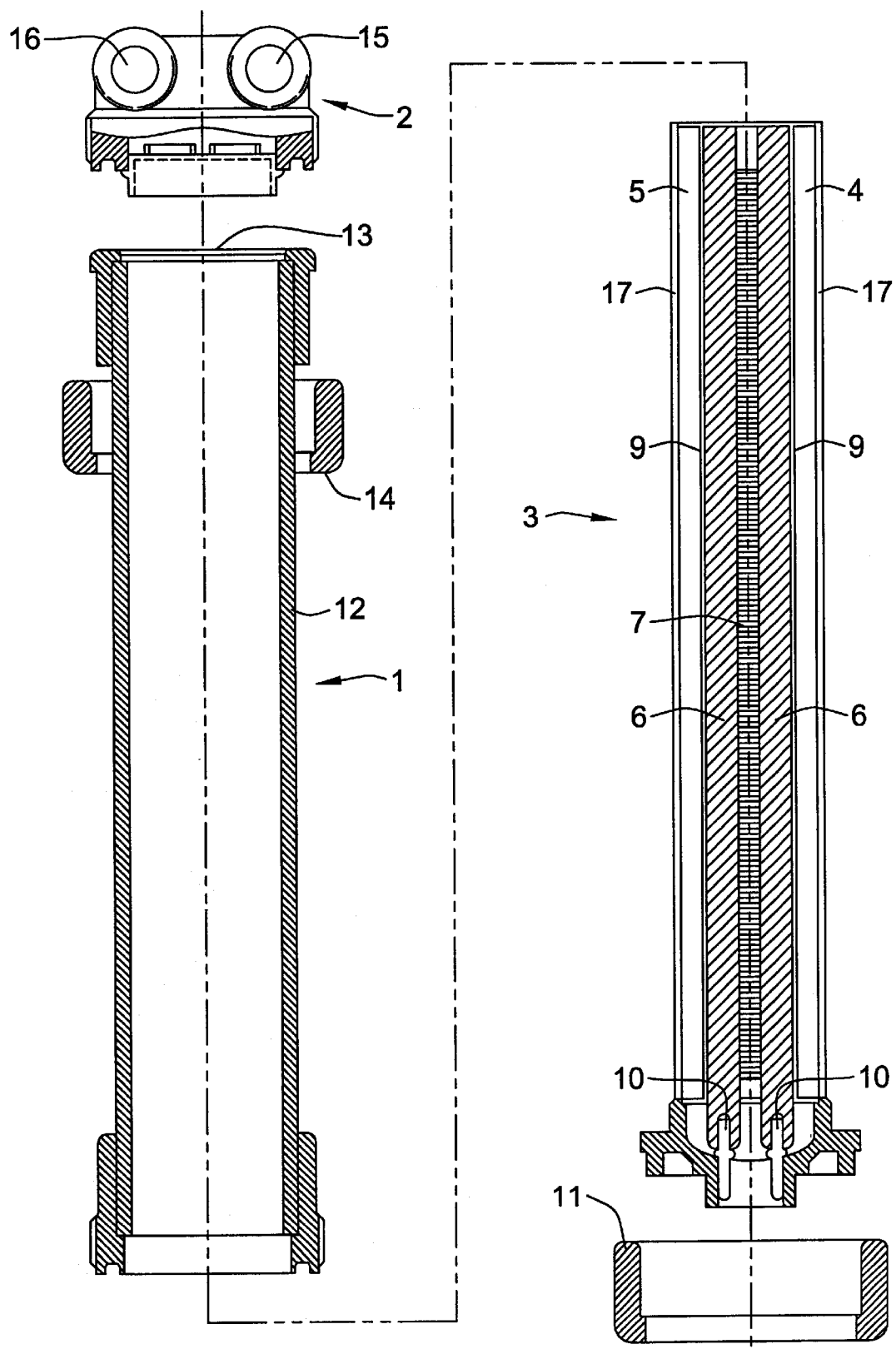
FIG. 1 is a cross-sectional view of an electrolysis apparatus according to the invention.

For the purposes or the present invention, the expressions "electrode" and "electrolysis chamber" are, because of the substantial analogy of the process parameters and the equipment which can be employed, used both for DC operation and for AC operation and encompass electrodes and electrolysis chambers as are known to those skilled in the art from electrolysis processes or are described below. For the purposes of the present invention, the expressions "AC potential" and "alternating current" encompass, in particular, AC potentials and alternating currents of customary frequencies, typically about 50 Hz. The essentially unchanged composition of the water means, for the purposes of the present invention, that the salt content and in particular the content of salts which tend to form scale is not significantly different in the treated aqueous solution from that in the aqueous feed solution which tends to form scale. Since the method of the invention makes it possible to essentially avoid removal of the dissolved salts, the total hardness of the treated solution does not differ significantly from that of the feed solution.

The method of the invention provides an essentially maintenance-free way of reducing or completely preventing scale formation from aqueous solutions which tend to form scale without the salt content or the pH of the solution being changed significantly or chemical water softeners having to be added and without salts such as calcite or excessively hardened water being obtained as waste. It is in principle suitable for the treatment of any aqueous solutions which tend to form scale. A particularly preferred application area is the treatment of drinking water (i.e. the treatment of water whose hardness is essentially attributable to the presence of calcium and magnesium ions) where it makes it possible, despite substantial or complete prevention of scaling, for the natural water quality to be essentially maintained. A further preferred application area is the pretreatment of water for washing machines, dishwashers and other appliances in which a water softener has hitherto usually had to be added.

A preferred aspect of the method of the invention is therefore the treatment of water having a natural content of carbonates, hydrogencarbonates and sulphates of calcium and magnesium.

The method of the invention makes it possible to prevent salt deposits such as calcite being obtained as waste, either as such or, as a result of reversing the polarity of the electrodes to remove deposits, in the form of excessively hardened water, i.e. it is characterized in that the total amount of the aqueous solution fed to the electrolysis chamber has a significantly reduced tendency to form scale after passing through the electrolysis chamber and essentially no calcite or excessively hard water is obtained as waste. Since removal of the dissolved salts can essentially be avoided by means of the new method, the aqueous solution treated according to the invention has a total hardness which is preferably not more than about 1° dH (German degree of hardness), in particular not more than about 0.5° dH, below that of the aqueous solution fed in. Since the pH of the aqueous solution is also not changed significantly according to the method of the invention, the treated solution has a pH which differs from that of the feed solution by not more than about 0.05.

The abovementioned reversal of the polarity of the electrodes in the case of direct current operation effects a change in the field direction and the current direction in the electrolysis chamber. It can advantageously be brought about by reversing the polarity of the DC potential applied by means of customary regulating and control devices which are well known to those skilled in the art.

The reversal of polarity can be carried out periodically at constant time intervals, e.g. every 2 seconds, or else at time intervals having different lengths, for example alternately after relatively short (e.g. 30 seconds) and relatively long (e.g. 45 seconds) intervals. The length of the time intervals is not critical; in general, however, intervals of not more than about 60 seconds, preferably from about 1 to 60 seconds, have been found to be useful.

In the simplest and preferred embodiment, the direct electric current can be fed in and taken off via two electrodes which are alternately connected as cathode and anode. If desired, it is also possible to use more than two electrodes, for example three electrodes, of which two are connected as anode and one as cathode, or four electrodes of which two are connected as anode and two function as cathode. In an analogous way, two or more electrodes can also be used for AC operation.

The optimum value of the DC or AC voltage is dependent, inter alia, on the electrode spacing, but is usually in the range from about 5 to 20 V per cm between the electrodes. The flow rate of the aqueous solution and the electric current are dependent on the dimensions of the apparatus, the salt content, the voltage and the like, but are not critical. In general, however, the ratio of the electric current flowing through the electrolysis chamber to the flow rate of the aqueous solution fed in is made not more than about 2 $A \cdot h/m^3$, with preference being given to a range from about 0.5 to $1.5 A \cdot h/m^3$, in particular from about 1.0 to 1.3 $A \cdot h/m^3$. In the method of the invention, it is also generally preferred for the current to be kept constant. For example, a current of not more than about 4 A, preferably not more than about 2 A, has been found to be useful for small apparatus having an electrode spacing of about 2 cm. Typically, the current is about 1–2 A, the voltage is about 20–40 V and the flow rate is from about 0.05 to 3 $m^3/h$.

When the apparatus is put into operation for the first time, a considerable reduction in the tendency to form scale is generally established only gradually, which might be attributable to the achievable effect only coming to bear fully when a certain minimum amount of calcite has been deposited on the electrodes and the bipolar electrode. However, it has been found that the optimum effect is generally achieved after only about 3–4 $m^3$ of aqueous solution have flowed through if, when the electrolysis chamber is put into operation for the first time or after the electrolysis chamber has been cleaned (or the bipolar electrode has been replaced), an aqueous solution which tends to form scale is fed to the electrolysis chamber, a DC voltage is applied to the electrodes and the polarity of the electrodes is reversed alternately at relatively short and relatively long time intervals until the treated aqueous solution displays a significantly reduced tendency to form scale.

Suitable apparatus for implementation of the method of the invention are electrolysis units comprising a water inlet system, a water outlet system and an electrolysis chamber having at least two electrodes of which, in the case of application of a DC potential, at least one acts as cathode and at least one acts as anode, and a bipolar electrode located between the electrodes, with the apparatus also being characterized in that the electrodes are either connected to an AC source or are connected via a regulating unit to a DC source in such a way that the polarity of the electrodes can be reversed at intervals of time. Apparatus operated by means of alternating current are new and are likewise subject matter of the present invention. The invention therefore likewise provides an electrolysis apparatus comprising a water inlet system, a water outlet system and an electrolysis chamber having a least two electrodes and a bipolar electrode located between the electrodes, with the apparatus additionally being characterized in that the electrodes are connected to an AC source. The following remarks apply, unless expressly indicated otherwise, both to an electrolysis apparatus operated using alternating current and to an apparatus operated using direct current.

The electrolysis chamber is preferably separated from the water inlet system and from the water outlet system by an envelope provided with openings. The size and shape of the openings are preferably selected such that the flow of the aqueous solution is hindered as little as possible but, on the other hand, when using a bipolar particle electrode, virtually no particles can escape. The envelope preferably comprises plastic and the openings preferably have the shape of small round holes or small slits. The water pressure is not critical for the method of the invention. However, the electrolysis chamber and the water inlet and water outlet systems are preferably of such a construction that the pressure drop is very small.

Suitable electrode materials are essentially all materials which are customarily used as long as their use in water treatment is acceptable. In general, preference is given to graphite. However, it is likewise possible to use other materials such as noble metals or titanium steel coated with noble metals or with mixed oxides. The electrode spacing is not critical and can be, for example, about 2 cm.

The DC or AC potential applied to the electrodes can, as a matter of choice, act perpendicular or parallel to the flow direction of the aqueous solution.

Suitable bipolar electrodes are likewise known to those skilled in the art. According to a preferred embodiment, the bipolar electrode located in the space between the electrodes can be, for example, a fixed-bed electrode, where the fixed bed can, in particular, comprise electrically conductive particles and nonconductive particles. Suitable electrically conductive particles are, for example, graphite, activated carbon, synthetic carbons and noble metals or other metals which release no ions; activated carbon and especially graphite have been found to be particularly suitable. Suitable nonconductive particles are essentially any inert and water-insoluble nonconductive materials, in particular silica, glass and plastics. The particle size of the conductive and nonconductive particles is not critical; however, materials having a mean particle size of from about 0.5 to 2 mm are generally preferred. To avoid the risk of short circuits, the volume ratio of the conductive particles to the nonconductive particles in the fixed bed should preferably be not more than about 1:1; particular preference is generally given to a ratio of about 1:2. When using a fixed bed, the electrodes are preferably introduced directly into the fixed bed and the aqueous solution preferably flows from the top downwards or horizontally through the fixed bed.

In place of a particle bed, it is also possible to use, for example, graphite rods which are provided with rings of insulating material such as nylon to avoid short circuits and are arranged as a stack. Such a bipolar electrode is described, for example, in Electrochimica Acta 22, 347–352 (1977).

In a further preferred embodiment, the bipolar electrode can be configured as a fluidized bed of electrically conductive particles; in this embodiment, the aqueous solution is preferably passed through the fluidized bed from the bottom upwards. In this embodiment, the flow rate is preferably made high enough for the flow alone to produce sufficient fluidization. Since short circuits are avoided as a result of the fluidization, the use of nonconductive particles is in principle superfluous. However, if desired, the fluidized bed can also contain nonconductive particles in addition to the electrically conductive particles. In this case, the materials mentioned above in connection with the fixed bed are preferred. Particular preference is given to the use of a fluidized bed which consists of only graphite particles.

Further preferred bipolar electrodes are porous sheets of electrically conductive material which are arranged parallel to the electrodes. To keep the sheets separate from one another and from the electrodes, spacers made of a nonconductive material such as plastic, glass and the like are preferably used.

Unlike the case of three-dimensional electrodes, the electric current in the case of bipolar electrodes is always forced to travel both through the electrically conductive material of the bipolar electrode and through the liquid medium. In the interstices between inert material and conductive material and in the pores of the conductive material, very high electric field intensities of several thousand V/m arise. It is known from studies by Onsager (J. Chem. Phys. 2, 599–615 (1934)) that these high field intensities can lead to changes in the dissociation constants. It is possible that the high field intensities cause an increased alkalinity which could result in formation of crystal nuclei.

Basically, the method of the invention results, when using direct current, in the same electrochemical reactions at the anode and the anodic surfaces of the bipolar electrode and at the cathode and the cathodic surfaces of the bipolar electrode as is the case in normal electrolysis, namely the formation of oxygen from water and of carbon dioxide from bicarbonate at the anode and the formation of hydrogen from water and of carbonate from bicarbonate at the cathode. The oxidation occurring at the anode and the anodic surfaces of the bipolar electrode might then also be a reason for the simultaneous denucleating effect of the method of the invention. Furthermore, the formation of carbonate causes the precipitation of calcite and the magnesium ions present in the water are precipitated in the interstices of the bipolar electrode as magnesium hydroxide.

However, in the method of the invention, reversing the polarity of the electrodes brings precipitates formed back into solution, thus effectively preventing blocking of the fixed-bed electrode and also avoiding a significant change in the salt content of the aqueous solution. However, if desired, the method can also be implemented in such a way that partial precipitation of the salts takes place at the same time. If, as mentioned above, the polarity is reversed at alternately relatively short and relatively long time intervals, the precipitates no longer go completely into solution and some of them remain in the electrolysis apparatus. Since the proportion of irreversible precipitation increases with increasing difference in the intervals, the desired salt content can easily be set in this way.

The interaction of the above-described mechanisms can therefore enable, according to the invention, scale formation or calcite deposition to be significantly reduced or even prevented entirely and can at the same time enable the composition of the water to be left essentially unchanged or, if desired, its salt content to be reduced in a targeted way.

A preferred embodiment of the electrolysis apparatus of the invention for operation using direct current is shown in longitudinal section in FIG. 1; for the sake of clarity, the housing 1, the connection head 2 and the interchangeable cartridge 3 are depicted individually.

FIG. 1 shows an interchangeable cartridge 3 having a chamber 4 for the untreated aqueous solution, a chamber 5 for the treated aqueous solution and an electrode chamber in which two graphite electrodes 6 and a bipolar fixed-bed electrode 7 of electrically conductive and nonconductive particles are arranged and which is separated from the chambers for the untreated and treated aqueous solutions by means of, in each case, an envelope 8, 9 having openings in the form of small holes or slits. The electrodes 6 are connected via power connections 10 to a regulating unit (not shown) which allows the polarity of the electrodes to be reversed at intervals of time and which is in turn connected to a direct current source. The cartridge 3 is, as indicated by the arrow and the axis of the apparatus drawn in as a broken line, pushed from the bottom into the housing 1 and fixed in place by means of a screw closure 11. The housing 1 consists essentially of an outer tube 12 and has at its other end a conductive metal plate 13 for screening off the electric field and a locking ring 14 which can be moved upwards and serves to fasten the connection head 2 having an inlet opening 15 for the untreated aqueous solution and an outlet opening 16 for the treated aqueous solution to the housing 1. The cartridge 3 preferably has an outer envelope 17 which closes off the outside of the chambers 4, 5 for the aqueous solution. If such an envelope 17 is not present, the outer tube 12 assumes this function. The outer tube 12 and the outer envelope 17 of the cartridge 3 are cylindrical in shape and the envelopes 8, 9 provided with openings preferably also together have at least approximately the shape of a cylinder, with the chambers 4, 5 for the untreated and the treated solutions being separated from one another by dividing walls which are above or below the plane of the drawing and are located between the envelopes 8, 9 and the envelope 17 or the outer tube 12.

When an aqueous solution is fed into the apparatus shown in FIG. 1 via the inlet opening 15, the solution flows from chamber 4 through the openings in the envelope 8 into the electrode chamber, flows essentially parallel to the electric field through the fixed bed and, after passing through the openings in the envelope 9, flows out through the chamber 5 and the outlet opening 16.

An apparatus for operation using alternating current can essentially be realized in an analogous way, but preference is generally given to smaller electrode areas and a larger electrode spacing for AC operation than for DC operation.

The method of the invention and its effect are illustrated by means of the following examples.

EXAMPLE 1

Drinking water from the municipality of Mondsee (Austria) was divided into two equal substreams. One substream was passed through a reversible-polarity electrolysis apparatus and subsequently through a hot water boiler. The other substream was passed without pretreatment directly through a hot water boiler of the same make. Both boilers were fitted with heating coils having the same heating power and identical regulators and measuring instruments were used, with PID regulators (Proportional-Integral-Differential regulators) being used for regulating the temperature.

As electrolysis apparatus, use was made of an apparatus as shown in FIG. 1 having two graphite electrodes, an electrode spacing of 2 cm and a bipolar fixed-bed electrode of graphite particles and silica in a volume ratio of 1:2. The experiments were carried out at a DC voltage of 40 V and the polarity was reversed alternately at intervals of 30 and 45 seconds. The throughput of drinking water was 500 l/h. The boiler temperature was regulated to 70° C. in both boilers.

After about 400 m$^3$ of water had flowed through each boiler, both boilers were acidified with nitric acid and the amount of calcite deposited in the boilers was determined.

The drinking water from the municipality of Mondsee which was used had a total hardness of 16.5° dH, a carbonate hardness of 15.5° dH, an electric conductivity of 530 µS/cm (25° C.), a pH of 7.5 (20° C.) and an acid capacity up to pH 4.3 of 5.5 mmol/l. The following values are calculated from these figures in accordance with DIN 38404-10:

| Calculation temperature: | 25° C. | 70° C. |
| --- | --- | --- |
| Buffering intensity: | 0.86 mmol/l | 1.09 mmol/l |
| Saturation index: | 0.46 | 0.83 |
| Calcite saturation pH: | 7.13 | 6.79 |
| Calcite deposition capacity: | 34.5 mg/l | 74.87 mg/l |

As the calculations show, the calcite deposition capacity is about 75 mg/l.

The calculation of the effectiveness was carried out as indicated in the DVGW test method "Prüfverfahren zur Beurteilung der Wirksamkeit von Wasserbehandlungsanlagen zur Verminderung von Steinbildung". On the basis of the abovementioned comparative experiments, an effectiveness factor of 98.5% was obtained for the water in Mondsee.

EXAMPLE 2

The experiment was carried out using drinking water from the municipality of Schriesheim (Germany). Here, a stream of 1 m$^3$/h was passed continuously through a reversible-polarity electrolysis apparatus as described in Example 1 and a substream of 20 l/h of the treated water was fed to a hot water boiler. The DC voltage applied to the electrolysis apparatus was 35 V and the polarity was reversed alternately at intervals of 30 and 45 sec. A stream of likewise 20 l/h was passed through a blank section, i.e. without pretreatment of the water, and directly through a second hot water boiler. Both sections, i.e. the section with pretreatment and the blank section, were provided with hot water boilers of the same make and heating coils having the same electric power. In both sections, the boiler temperature was regulated to a temperature of 80° C. using identical regulators. The total duration of the experiment was 21 days.

The drinking water was analysed before and after passing through the electrolysis apparatus, giving the following values:

|  | before treatment | after treatment |
| --- | --- | --- |
| Calcium | 135 mg/l | 134 mg/l |
| Magnesium | 22.3 mg/l | 22.7 mg/l |
| Sodium | 21.3 mg/l | 21.4 mg/l |
| Chloride | 69 mg/l | 69 mg/l |
| Sulphate | 79.2 mg/l | 77.7 mg/l |
| Nitrate | 36.6 mg/l | 36.6 mg/l |
| pH (20° C.) | 7.38 | 7.37 |
| Conductivity (20° C.) | 109.2 mS/m | 109.4 mS/m |
| Acid capacity up to pH 4.3 | 5.36 mol/m$^3$ | 5.5 mol/m$^3$ |

The analytical results show that the pretreatment in the electrolysis apparatus causes no appreciable chemical change in the drinking water. The evaluation of the amounts of lime in the two boilers (using the method described in Example 1) indicated that scale formation was prevented to an effectiveness factor of 92.2% by the pretreatment, i.e. scaling could be largely avoided while maintaining the water quality.

What is claimed is:

1. A method of reducing scale formation in an aqueous solution using an electrolysis apparatus which has, in an electrolysis chamber, two electrodes and a bipolar electrode between the two electrodes, the method including feeding an aqueous solution which tends to form scale into the electrolysis chamber, and applying either a DC potential to the two electrodes so that one of the two electrodes is an anode and one of the two electrodes is a cathode and reversing the polarity of the electrodes at intervals, or applying an AC potential to the two electrodes, thereby producing, after the aqueous solution has passed through the electrolysis chamber, a treated aqueous solution having a significantly reduced tendency to form scale and a composition essentially unchanged from that of the aqueous solution.

2. The method according to claim 1 including feeding water having a natural content of carbonates, hydrocarbonates, and sulphates of calcium and magnesium into the electrolysis chamber.

3. The method according to claim 1, wherein the aqueous solution fed into the electrolysis chamber produces, after passing through the electrolysis chamber, essentially no calcite and no excessively hard water as waste.

4. The method according to claim 1, wherein the total hardness of the treated aqueous solution is not reduced by more than 1° dH, compared to the total hardness of the aqueous solution fed into the electrolysis chamber.

5. The method according to claim 1, wherein the pH of the treated aqueous solution differs by not more than 0.05 from that of the aqueous solution fed into the electrolysis chamber.

6. The method according to claim 1, including applying the DC potential to the two electrodes and reversing the polarity of the two electrodes at uniform intervals of time.

7. The method according to claim 1, including applying the DC potential to the two electrodes and reversing the polarity of the two electrodes at alternately relatively short and relatively long time intervals.

8. The method according to claim 1, including applying the DC potential to the two electrodes and reversing the polarity of the two electrodes at time intervals of from 1 to 60 seconds.

9. The method according to claim 1, wherein the electric current flowing through the electrolysis chamber divided by the flow rate of the aqueous solution fed into the electrolysis chamber is not more than 2 A·h/m$^3$.

10. The method according to claim 9, wherein the electric current flowing through the electrolysis chamber divided by the flow rate of the aqueous solution fed into the electrolysis chamber is from 1.0 to 1.3 A·h/m$^3$.

11. The method according to claim 1, wherein the electric current flowing through the electrolysis chamber is not more than 4 A.

12. The method according to claim 1, including applying a DC or AC field of 5–20 V per cm between the two electrodes.

13. The method according to claim 1, wherein the two electrodes are selected from the group consisting of graphite, noble metals, and titanium steel coated with a coating selected from the group consisting of noble metals and mixed oxides.

14. The method according to claim 1, wherein the two electrodes are separated by a distance of about 2 cm from each other.

15. The method according to claim 1, wherein the bipolar electrode is a bipolar fixed-bed electrode.

16. The method according to claim 15, wherein the bipolar fixed-bed electrode is a fixed bed of electrically conductive particles and nonconductive particles.

17. The method according to claim 16, wherein the electrically conductive particles are selected from the group consisting of graphite particles and activated carbon particles, and the nonconductive particles are selected from the group consisting of silica particles, glass particles, and plastic particles.

18. The method according to claim 16, wherein the electrically conductive particles and the nonconductive particles are present in the fixed bed in a volume ratio of not more than 1:1.

19. The method according to claim 1, wherein the bipolar electrode comprises porous sheets of electrically conductive material arranged parallel to the two electrodes.

20. The method according to claim 19, wherein the sheets are separated from each other and from the two electrodes by nonconductive spacers.

21. The method according to claim 1, wherein the bipolar electrode is a fluidized bed of electrically conductive particles and the aqueous solution flows upwards through the fluidized bed.

22. The method according to claim 1, wherein the electrolysis apparatus has a water inlet and a water outlet separated from the electrolysis chamber by an envelope including openings.

23. The method according to claim 1, comprising pretreating the electrolysis apparatus, including feeding an aqueous solution which tends to form scale into the electrolysis chamber, applying a DC potential to the two electrodes, and reversing the polarity of the two electrodes alternately at relatively short and relatively long time intervals until the treated aqueous solution has a significantly lower tendency to form scale.

* * * * *